(12) United States Patent
Feigen

(10) Patent No.: US 8,464,208 B2
(45) Date of Patent: Jun. 11, 2013

(54) CAPTURING AND UTILIZING SPECIFIC MODULE DEPENDENCY INFORMATION

(75) Inventor: Lawrence Feigen, Watchung, NJ (US)

(73) Assignee: Oracle International Corporation, Redwood Shores, CA (US)

(*) Notice: Subject to any disclaimer, the term of this patent is extended or adjusted under 35 U.S.C. 154(b) by 169 days.

(21) Appl. No.: 12/748,306

(22) Filed: Mar. 26, 2010

(65) Prior Publication Data

US 2011/0239184 A1    Sep. 29, 2011

(51) Int. Cl.
*G06F 9/44* (2006.01)
(52) U.S. Cl.
USPC ............................. 717/104; 717/141; 717/159
(58) Field of Classification Search
None
See application file for complete search history.

(56) References Cited

U.S. PATENT DOCUMENTS

| | | | |
|---|---|---|---|
| 7,076,764 B2* | 7/2006 | Kramer | 717/120 |
| 7,174,540 B2* | 2/2007 | Ondrusek et al. | 717/120 |
| 7,752,158 B2* | 7/2010 | Wookey | 706/61 |
| 2006/0005177 A1* | 1/2006 | Atkin et al. | 717/151 |
| 2012/0151469 A1* | 6/2012 | Wookey | 717/175 |

\* cited by examiner

*Primary Examiner* — Isaac Tecklu
*Assistant Examiner* — Hossain Morshed
(74) *Attorney, Agent, or Firm* — Fliesler Meyer LLP

(57) ABSTRACT

Systems and methods are described for capturing and utilizing specific module dependency information. A hierarchical model can be created to arrange the components an existing software system in a particular hierarchy. The model defines a priority of dependencies among the components. A tool is provided for analyzing each class file of the system for references to other class files and determining, for each said class file, whether each reference is acceptable according to the hierarchical model. Once the class files and references have been analyzed, a surrogate class file can be automatically generated for the references that are determined to be unacceptable according to the hierarchical model. This process can utilize white lists and black lists associated with the class files, where the white lists specify modules to which references are acceptable and the black lists specify modules to which references are unacceptable.

15 Claims, 4 Drawing Sheets

| Module | #Classes in Facade | # Classes in other Facades | Last Updated |
|---|---|---|---|
| module_a | 0 | 3 | NA |
| module_b | 11 | 38 | August 3, 2009 |
| module_c | 0 | 1 | NA |
| ... | | | |
| ... | | | |
| ... | | | |
| module_x | 89 | 47 | December 2, 2008 |
| | | | |
| Totals | 479 | 478 | |

CAPTURING AND UTILIZING SPECIFIC MODULE DEPENDENCY INFORMATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to software design and development, and more particularly to modularizing large legacy systems and other software products.

BACKGROUND

When a software product is being produced, the various parts of the system usually form specific dependencies. For example, one component or code segment may depend on another component, which in turn depends on other code and so on. Developers of software upon which other software depends typically need to be continually aware of how changing their code may affect others.

Modularizing large and otherwise complex systems has become an important issue in the context of software development. When a large system is built in separate and independent modules, it is usually easier to implement changes, run tests and otherwise maintain the software. Because of this, most systems today are being built on at least some basis of modularity. The interdependencies between all of these modules, however, are often not well documented. For example, when the interdependent software has previously been produced as part of the same unit, the interdependencies are usually voluminous and not well understood. In the past, the problems of recognizing interdependencies and capitalizing on this knowledge was a manual process, requiring engineers to analyze code and perform other tedious labor.

In light of the above, what is needed is a system for capturing and utilizing module dependency information, while simultaneously ensuring the integrity and consistency of the system. In addition, it is desirable that this dependency information be obtainable from large existing systems that may not have been built strictly adhering to these concerns. The applicant-inventor has identified these, as well as other shortcomings and needs in the art in coming to conceive the subject matter described in this disclosure.

SUMMARY OF INVENTION

In this specification, systems and methods are described for capturing and utilizing specific module dependency information. A hierarchical model is created to arrange the components of an existing software system in a particular hierarchy. The model defines the layering of dependencies among the components. A tool is then provided for analyzing each class file of the system for references to other class files and determining, for each said class file, whether each reference is acceptable according to the hierarchical model. Once the class files and references have been analyzed, surrogate class files can be automatically generated for the references that are determined to be unacceptable, i.e. to not adhere according to the hierarchical model. The surrogate files can be used by the build system to compile the system in a modular fashion, by substituting the surrogate version for the reference to the unacceptable class file.

Some of the advantages of such a system can allow a team of developers to work together to break the dependencies of user class files to the bad class files. As a result, it is possible to build the legacy software as modules, even if the modules have circular dependencies. Furthermore, information about what needs to be fixed can be produced for the engineers in the form of web pages, documents, IDE plugins, and the like, and for the management in the form of status and progress reports. The owners of depended-upon modules can know how the modules are used, specifically, in order to prevent breaking the code of their users. One large use of these results is the ability to break a large set of interleaved software (e.g. an application server) into a set of independent modules, a task that was usually considered too time-consuming to be considered previously.

BRIEF DESCRIPTION OF THE DRAWINGS

FIG. 4 is an illustration of a table that can be generated as a result of the analysis of the system class files, in accordance with various embodiments of the invention.

DETAILED DESCRIPTION

Figure 1:
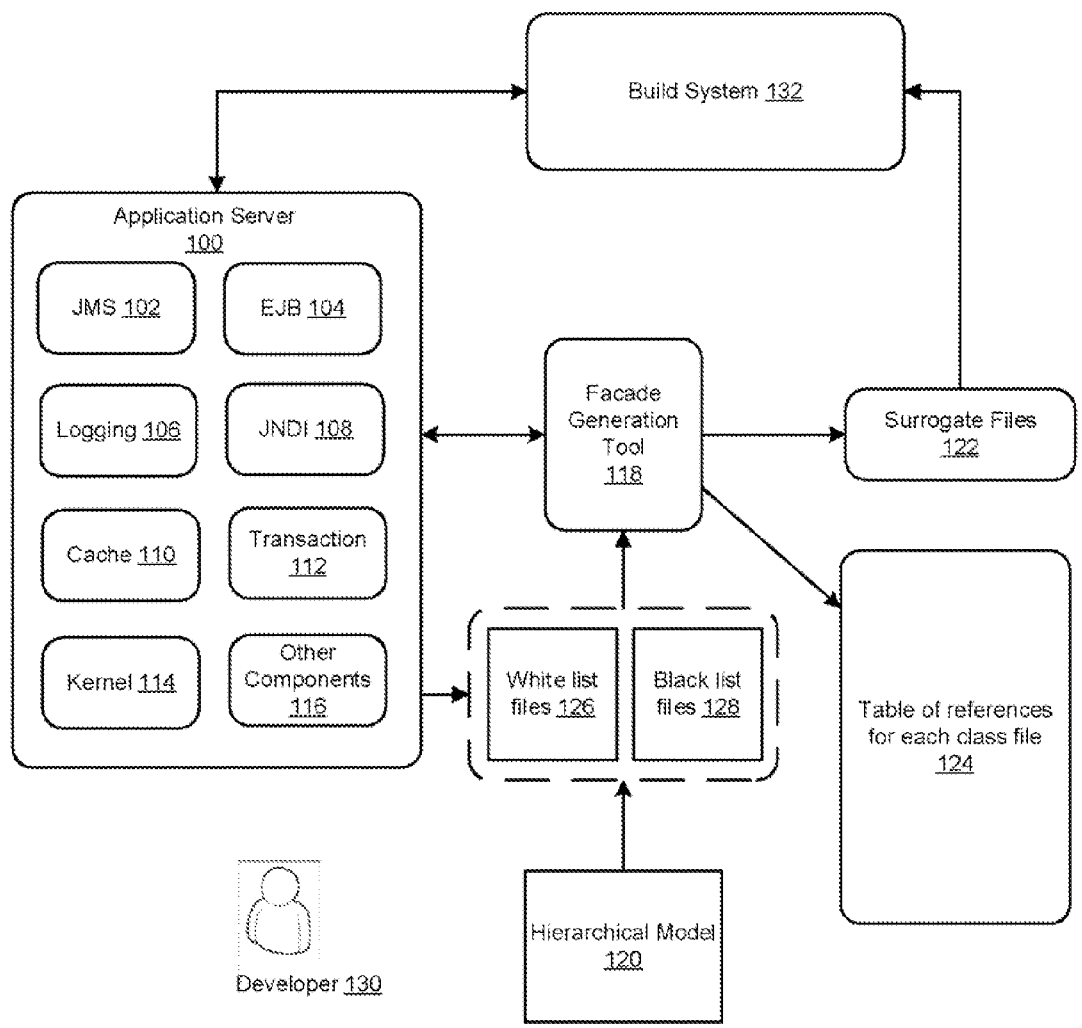
FIG. 1 is an illustration of the system for capturing and utilizing dependencies, in accordance with various embodiments of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The embodiments of the present invention encompass methods and techniques for capturing dependency information among modules that comprise a software system and utilizing that information in some meaningful fashion. A tool is provided for generating build facades (surrogate files) for references between multiple modules of the system. In one embodiment, the tool is given three sets of Java class files: the user files (e.g. class file that defines a particular module), the white list files and the black list files. The tool then analyzes the references made by the user files and classifies the uses into good and bad uses, where references to black list classes are bad (unacceptable). In one embodiment, the references are analyzed according to a hierarchical model of the system that defines priority of dependencies among the system modules. In this embodiment, if a particular component is lower on the hierarchical priority than some other component, then a reference from that component to the higher level component can be considered unacceptable or "bad." The tool captures the bad uses in the form of class files that form surrogate versions of the bad class files. These surrogate versions of class files can be used by the build system to compile the system in a modular fashion, by substituting the surrogate version for the reference to the unacceptable class file. In other words, the surrogates can be used as replacements for the bad files.

While the hierarchical model is used in the preferred embodiment, in various other embodiments, other criteria can be used to determine whether dependencies are acceptable. Thus, rather than using the system module hierarchy, it may be that it is simply undesirable for the particular system that a certain module depend on another certain other module. For instance, it may be undesirable that JMS depends on logging. This type of criteria may be outside of the module hierarchy but still be implemented In one embodiment the tool generally operates on class files, not source files, though the source files can be used as well. In alternative embodiments, the tool can operate on source files only.

In various embodiments, the tool allows a team of developers to break the dependency from the user class files to the bad class files. There are several important results of this. First, it is possible to build the software as modules, even if the modules have circular dependencies. Secondly, information about what needs to be fixed can be produced for the engineers in the form of web pages, documents, IDE plugins, and the like, and for the management in the form of status and progress reports. Thirdly, the owners of depended-upon modules can know how the modules are used, specifically, in order to prevent breaking the code of their users. In this third embodiment, rather than using the tool to analyze a single system, the tool can be used to recognize interactions between systems. For example, this can be done in the context of a product layered on top of an application server, such as a service bus. The service bus may use many of the software interfaces of the application server, but the engineers responsible for maintaining the application server may not know which of those interfaces the service bus uses. The tool described throughout this disclosure can be used to capture this information.

Another large use of these results is the ability to break a large set of interleaved software (e.g. an application server) into a set of independent modules, a task that was usually considered too time-consuming to be considered previously.

In one embodiment, the method for capturing the dependency information begins by reading a hierarchical model that categorizes system modules of a software system. This hierarchical model can be defined by the engineers to specify the priority of dependencies among the system modules. For example, in an application server that contains a JAVA Messaging Service (JMS) component and a Logging component, most developer would typically agree that it is acceptable for JMS to depend on logging, but it is unacceptable (or at least undesirable) that logging depend on JMS. In this particular instance, the hierarchical model would be defined as placing JMS above logging in terms of dependency priority. It should be noted, however, that this particular example is not intended to limit the various embodiments described herein in any way.

Once the hierarchical model is read, each class file of the system can be analyzed for references to other system modules in light of this model. The façade generation tool can determine, for each class file, whether the references adhere to the hierarchical model. To follow the example mentioned above, if a JMS class file contained references to a logging class file, those references would be acceptable (adhere) to the hierarchical model. If, on the other hand, a logging class file contained references to the JMS class file, those references would be flagged as unacceptable or bad according to the hierarchical model.

In various embodiments, for the references that are deemed unacceptable, the tool can generate a surrogate class file for each bad file referenced by the reference. Once the system is modularized, this surrogate can be used as a replacement for the bad class file when building the module containing the reference. In addition, information regarding the unacceptable references in each system module can be displayed in a table, with links to the specific portions of the class file where the references are located. This table can assist the developers working on modularizing the system.

In one embodiment, the surrogate file can simply have methods with no body so that they cannot be used at runtime. In other embodiments, however, the surrogate can invoke other code (possibly real code) in order to isolate the caller from callee. As such, the tool can also be used to generate software that suits the build façade pattern.

FIG. 1 is an illustration of the system for capturing and utilizing dependencies, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a software system (e.g. an application server) 100 can comprise a plurality of system components. For example, an application server 100 can include components for JAVA Messaging Service (JMS) 102, Enterprise JAVA Beans (EJB) 104, Logging 106, JAVA Naming Directory Interface (JNDI) 108, caching 110, transaction 112, a kernel 114, as well as various other system components 116 that enable the application server to perform its functions. Each of these system components can include one or more class files. In many cases, however, these components may have been built as part of a single unit, without delineating the various interdependencies between them.

In one embodiment, the developer(s) 130 can define a hierarchical model view 120 of the system. This model can specify the priority of dependencies for each component of the system in a hierarchical fashion. Thus, if one particular component is lower on the hierarchy than another component, it should not depend on that other component. For example, if JMS 102 is placed higher in the hierarchy than Logging 106, then the model specifies that it is unacceptable for Logging to depend on JMS. Stated alternatively, it would be unacceptable for logging class files to contain references to JMS class files.

In one embodiment, this hierarchical model 120 can be used to generate a set of white list 126 files and a set of blacklist files 128 for each class file of the system. The façade generation tool 118 can then take the black list and white list as inputs, in addition to the class file. Based on these three inputs, the tool 118 can analyze the references in the class files and determine whether each reference is acceptable or not according to the model. For all unacceptable references, the tool 118 can generate surrogate files 122 for the class files referenced by these references. The surrogate classes can be used by the build system 132 when building the module from the class containing the unacceptable reference.

Figure 2:
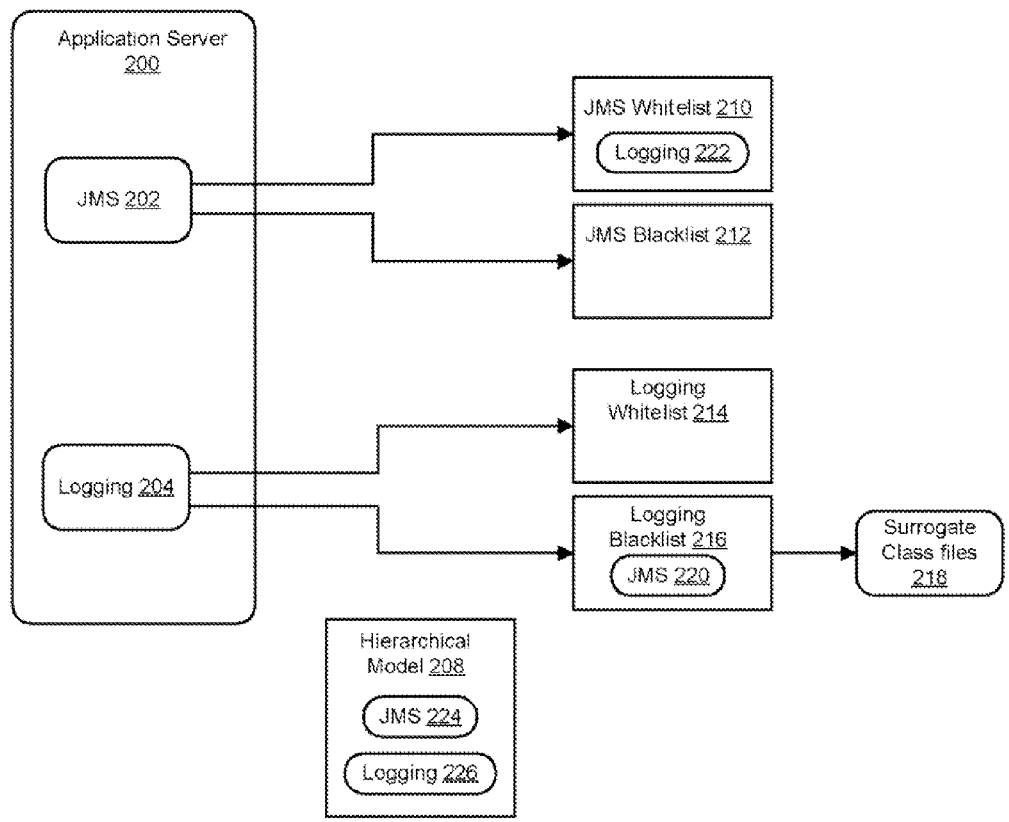
FIG. 2 is another illustration of the system for capturing and utilizing dependencies, in accordance with various embodiments of the invention.

FIG. 2 is another illustration of the system for capturing and utilizing dependencies, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Illustrated in FIG. 2, is an example of several components of the software application server 200, namely the JMS component 202 and the logging component 204. As defined in the model, JMS 224 is higher on the hierarchy than the logging component 226. As such, it is acceptable according to the model that JMS class file(s) refers to logging, but it is not acceptable that logging class file(s) refer to JMS.

In one embodiment, a black list 212 and a white list 210 is generated for the JMS class file. In addition, the Logging class file 204 is provided with its own black list 216 and white list 214. These black lists and white lists are files generated according to the hierarchy specified in the model 208. Thus, logging 222 appears in JMS' white list and JMS 220 appears in logging's black list. In turn, for each reference to a file in the black list, a surrogate file 218 can be generated, as shown.

Figure 3:
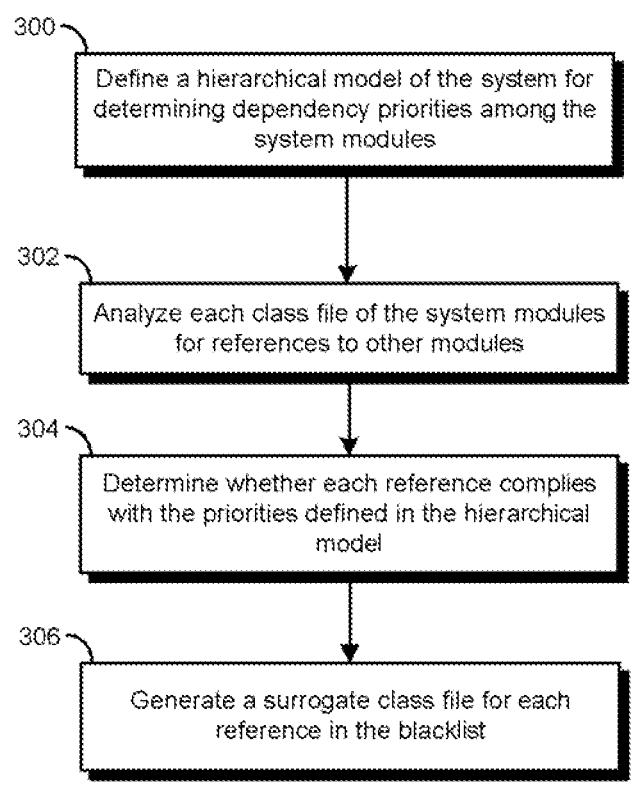
FIG. 3 is a flow chart diagram of the process for capturing and utilizing dependency information, in accordance with various embodiments of the invention.

FIG. 3 is a flow chart diagram of the process for capturing and utilizing dependency information, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 300, a hierarchical model of the system is defined for determining dependency priorities among the system modules. The hierarchical model can be thought of as a layered wedding cake of all components of the system arranged in a hierarchy, such that components higher in the hierarchy have a higher precedence in terms of dependence on other components which are lower on the hierarchy. According to this hierarchical model, the blacklist and white list files can be generated. In certain embodiments, the hierarchical model can be defined by a developer or programmer having knowledge of the system. In other embodiments, a build system or other tool can be used to automatically generate the hierarchical model.

In step 302, each class file of the system modules is analyzed for references to other modules of the system. In one embodiment, this is done according to the black list and the white list generated from the model. Thus, as shown in step 304, the tool can determine whether each reference complies with the priorities defined in the hierarchical model. For example, if the reference is to a module that appears in the file's blacklist, the reference is deemed unacceptable according to the hierarchical model.

In step 306, surrogate class files are automatically generated for each reference that does not adhere to the hierarchical model. In one embodiment, if the reference is to a class in the black list associated with the file, then a surrogate class is generated for that class. These surrogate classes can then be used as part of the build system, as replacements for the files in the blacklist. This allows the class file to break its undesirable dependencies on other classes and enables the compiler to build the class file in a modular fashion.

FIG. 4 is an illustration of a table that can be generated as a result of the analysis of the system class files, in accordance with various embodiments of the invention. As illustrated, the table includes several columns of information regarding the various components of the software system. The first column lists the module name, such as "module_a," "module_b" and so on. The second column labeled "number of classes in the façade" specifies the number of references in this module to other modules that are deemed unacceptable according to the hierarchical model view of the system. The third column labeled "number of classes in other facades" specifies the number of unacceptable references from other modules to this particular module. Finally, the last column displays the last time this particular module was modified.

In various embodiments, the table can be used by the developers trying to break up a large set of interleaved software of the existing system into a set of independent modules. For example, if the second and third column can be reduced to zero dependencies, then the system can become truly modular, that is the modules can be mixed and matched and built independently. The table can guide the developers responsible for each module in this effort. For example, in one embodiment, clicking on the number of bad references to other classes can automatically take the developer to the portion of the module that contains the reference. This allows the developer responsible for the particular portion of the system to know specifically where their code depends on other components or where other code depends on their code and enable them to remove the dependencies.

It should be noted, however, that although this diagram depicts the table in a particular format, this format is not intended to be in any way limiting. Moreover, the information rendered on the table is shown purely for purposes of illustration, and can comprise additional elements or can omit some of the elements as desired.

It should further be noted that the term "build façade" as used throughout this disclosure is different from and does not precisely match the definition of a general notion of the façade pattern as used in object oriented programming, which indicates some sort of a simplified interface to a larger body of code. In contrast, the term "façade" or "build façade" as used in this disclosure, signifies a surrogate file that is generated and substituted for unacceptable class files, as previously described.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for capturing and utilizing specific module dependency information, said method comprising:
    creating a hierarchical model of components of a software system comprising class files, wherein said hierarchical model defines a priority of dependencies among said components;
    classifying references made by a user file that defines a particular component, into acceptable references and unacceptable references, according to the hierarchical model; creating a surrogate class file for each of said unacceptable references;
    substituting the surrogate class file by a compiler for a class file referenced by the unacceptable reference when building the component containing the reference; and
    segregating the class files of the software system into a set of independent modules by using the surrogate class files.

2. The method of claim 1, further comprising:
    generating a table of all class files of the system; and
    rendering information regarding the unacceptable references for each of said class files in the table.

3. The method of claim 2, wherein said table further includes:
    unacceptable references from said class file to other class files; and
    unacceptable references from other class files to said class file.

4. The method of claim 1, wherein classifying the references made by the user file, further includes:
    generating, for each said class file, a white list and a black list, wherein the white list specifies class files to which references from said class file are acceptable and the black list specifies class files to which references from said class file are unacceptable.

5. The method of claim 1, wherein circular dependencies between two or more class files are resolved by employing the surrogate file.

6. The method of claim 1, further comprising:
    generating a contract between the software system and a second software system, wherein said contract specifies a list dependencies on modules in the software system that said second software system will depend on.

7. The method of claim 1, wherein the step of analyzing the class files is based on reading only packaged software files without the need to analyze code.

8. A system for capturing and utilizing specific module dependency information, said system comprising:
    one or more processors;
    a hierarchical model that specifies priority of dependencies among components of a software system executed on the one or more processors;
    a class file of the software system that contains references to one or more other class files of said software system;
    a façade generation tool that classifies references made by a user file that defines a particular component, into acceptable references and unacceptable references, according to the hierarchical model, and creates a surrogate class file for each said of unacceptable references; and
    a compiler that substitutes the surrogate class file for a class file referenced by the unacceptable reference in building the component containing the reference;
    wherein all of the class files of the software system are segregated into a set of independent modules by using the surrogate class files.

9. The system of claim 8, wherein a table of all class files of the computer program is generated and wherein information regarding the unacceptable references for each of said class files is rendered in the table.

10. The system of claim 9, wherein said table further includes:
    unacceptable references from said class file to other class files; and
    unacceptable references from other class files to said class file.

11. The system of claim 8, wherein the façade generation tool further receives a white list file and a black list file, wherein the white list specifies class files to which references from said class file are acceptable and the black list specifies class files to which references from said class file are unacceptable.

12. The system of claim 8, wherein circular dependencies between two or more class files are resolved by employing the surrogate file.

13. The system of claim 8, wherein a contract is generated between the software system and a second software system, wherein said contract specifies a list dependencies on modules in the software system that said second software system will depend on.

14. The system of claim 8, wherein analyzing the class files is based on reading only packaged software files, without the need to analyze code.

15. A computer-readable non-transitory storage medium carrying one or more sequences of instructions for capturing and utilizing specific module dependency information, which instructions, when executed by one or more processors, cause the one or more processors to carry out the steps of:

creating a hierarchical model of components of a software system comprising class files, wherein said hierarchical model defines a priority of dependencies among said components;

classifying references made by a user file that defines a particular component, into acceptable references and unacceptable references, according to the hierarchical model;

creating a surrogate class file for each of said unacceptable references; and substituting the surrogate class file by a compiler for a class file referenced by the unacceptable reference when building the component containing the reference;

wherein all of the class files of the software system are segregated into a set of independent modules by using the surrogate class files.

* * * * *

UNITED STATES PATENT AND TRADEMARK OFFICE
CERTIFICATE OF CORRECTION

PATENT NO. : 8,464,208 B2  
APPLICATION NO. : 12/748306  
DATED : June 11, 2013  
INVENTOR(S) : Feigen Page 1 of 1

It is certified that error appears in the above-identified patent and that said Letters Patent is hereby corrected as shown below:

On title page column 2, item [57] in abstract, line 3, after "components" insert -- of --.

In the Specification

Column 3, line 20, after "implemented" insert -- . --.

Column 4, line 23, delete "façcade" and insert -- façade --, therefor.

In the Claims

Column 8, line 9, in Claim 6, after "list" insert -- of --.

Column 8, line 57, in Claim 13, after "list" insert -- of --.

Signed and Sealed this  
Fifteenth Day of October, 2013

Teresa Stanek Rea  
*Deputy Director of the United States Patent and Trademark Office*